United States Patent
Romanyszyn

(10) Patent No.: US 7,186,087 B2
(45) Date of Patent: Mar. 6, 2007

(54) METHOD AND APPARATUS FOR A DISPENSING SYSTEM WITH A DUAL DIRECTION PADDLEWHEEL

(75) Inventor: Adrian M. Romanyszyn, San Antonio, TX (US)

(73) Assignee: Lancer Partnership, Ltd.

( * ) Notice: Subject to any disclaimer, the term of this patent is extended or adjusted under 35 U.S.C. 154(b) by 14 days.

(21) Appl. No.: 10/849,077

(22) Filed: May 19, 2004

(65) Prior Publication Data
US 2005/0258196 A1   Nov. 24, 2005

(51) Int. Cl.
*F01D 25/00* (2006.01)
*B67D 5/62* (2006.01)

(52) U.S. Cl. ................. 416/183; 222/146.6
(58) Field of Classification Search ........... 29/894; 416/179, 182, 183, 185, 197 R, 223 B; 222/146.6; 62/344; 221/146.6
See application file for complete search history.

(56) References Cited

U.S. PATENT DOCUMENTS

| | | | | |
|---|---|---|---|---|
| 2,083,996 A | * | 6/1937 | Jonn | 416/178 |
| 2,805,756 A | * | 9/1957 | Fowler | 414/790.4 |
| 3,237,276 A | * | 3/1966 | Von Der Ohe | 241/294 |
| 3,592,366 A | * | 7/1971 | Markley et al. | 222/242 |
| 3,599,780 A | * | 8/1971 | Sorbie | 198/803.11 |
| 3,687,261 A | * | 8/1972 | Guckel | 198/480.1 |
| 5,054,654 A | * | 10/1991 | Schroeder et al. | 222/146.6 |
| 5,104,007 A | * | 4/1992 | Utter | 222/146.6 |
| 6,607,096 B2 | * | 8/2003 | Glass et al. | 222/1 |

* cited by examiner

*Primary Examiner*—Edward K. Look
*Assistant Examiner*—Devin Hanan
(74) *Attorney, Agent, or Firm*—Christopher L. Makay

(57) ABSTRACT

A dual rotation paddlewheel includes tangs that are equally effective in either direction of rotation. The paddlewheel includes tangs disposed around an outer periphery of a body. The dual rotation paddlewheel includes a primary face for use in a first direction and a secondary face for use in a second rotation direction. The tangs may also include a crossbar for increased shear strength. The increased cross sectional area eliminates problems associated with breaking tangs off of the paddlewheel and entering the product stream. Existing product engagement areas in existing designs have been preserved with the dual direction design. The dual direction paddlewheel allows for the consolidation of rotation specific designs into a single part, thereby eliminating costs associated with carrying multiple single direction paddlewheels as well as tooling and manufacturing costs for multiple paddlewheel designs.

17 Claims, 10 Drawing Sheets

METHOD AND APPARATUS FOR A DISPENSING SYSTEM WITH A DUAL DIRECTION PADDLEWHEEL

BACKGROUND OF THE INVENTION

1. Field of the Invention

The present invention relates to product dispensing and, more particularly, but not by way of limitation, to methods and apparatus for a paddlewheel design that is equally effective in either rotation direction.

2. Description of the Related Art

In the post-mix beverage dispensing industry, most beverages are served with a form of ice. Beverage dispenser manufacturers have long since integrated ice dispensers into beverage dispensers. Most dispensers on the market use an interior ice bin that may be manually or automatically filled. Ice in the ice bin is then picked up by a rotating paddlewheel having tangs or another product engagement device, passed over an opening, and dispensed through a chute into an operator's cup.

While variations in paddlewheels exist for different products and vendors, most paddlewheels scoop or push a product to a dispensing port. Most paddlewheels are unidirectional, meaning that they are not equally effective in moving product when rotated in two opposite directions. The need for a second direction of rotation did not appear in the beverage dispensing industry until two dispensers were combined to create a high capacity unit. In dual dispenser applications having a single bin, it has been found that it is not advantageous to have two paddlewheels rotating in the same direction. The same rotation pattern tends to move ice in the bin to one side of the dispenser. As such, a second variation of the paddlewheel had to be tooled, manufactured and inventoried.

Additionally, the tangs are susceptible to excessively high loading when an obstruction enters the ice path. Objects caught in the path of the paddlewheel tangs can cause the tangs to shear off of the paddlewheel, enter the ice dispense path, and ultimately, be dispensed into an operator's cup.

Accordingly, a dual rotation paddlewheel having an increased strength could eliminate the problems associated with tang breakage, while simultaneously reducing the inventory and tooling costs associated with single rotation direction paddlewheels.

SUMMARY OF THE INVENTION

In accordance with the present invention, a dual direction paddlewheel provides the ability to move product in either rotation direction. The paddlewheel includes tangs disposed around an outer periphery of a body. The design of the dual direction paddlewheel further increases the inertial properties of the tangs, such that the tangs will remain attached to the paddlewheel body in the case of an obstruction in the path of the tangs.

The dual direction paddlewheel may be utilized in single rotation dispensers, as well as dual rotation dispensers. Existing product engagement areas in existing designs have been preserved with the dual direction design. The dual direction paddlewheel allows for the consolidation of rotation specific designs into a single part.

It is therefore an object of the present invention to provide a dual rotation direction paddlewheel.

It is a further object of the present invention to utilize a dual direction paddlewheel in single direction paddlewheel applications.

It is still further an object of the present invention to maintain existing engagement areas of the paddlewheels.

It is still yet further an object of the present invention to increase the shear strength of the tangs to reduce tang breakage when an obstruction is encountered.

It is still yet further an object of the present invention to provide a paddlewheel for dual dispenser applications.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

Figure 1:
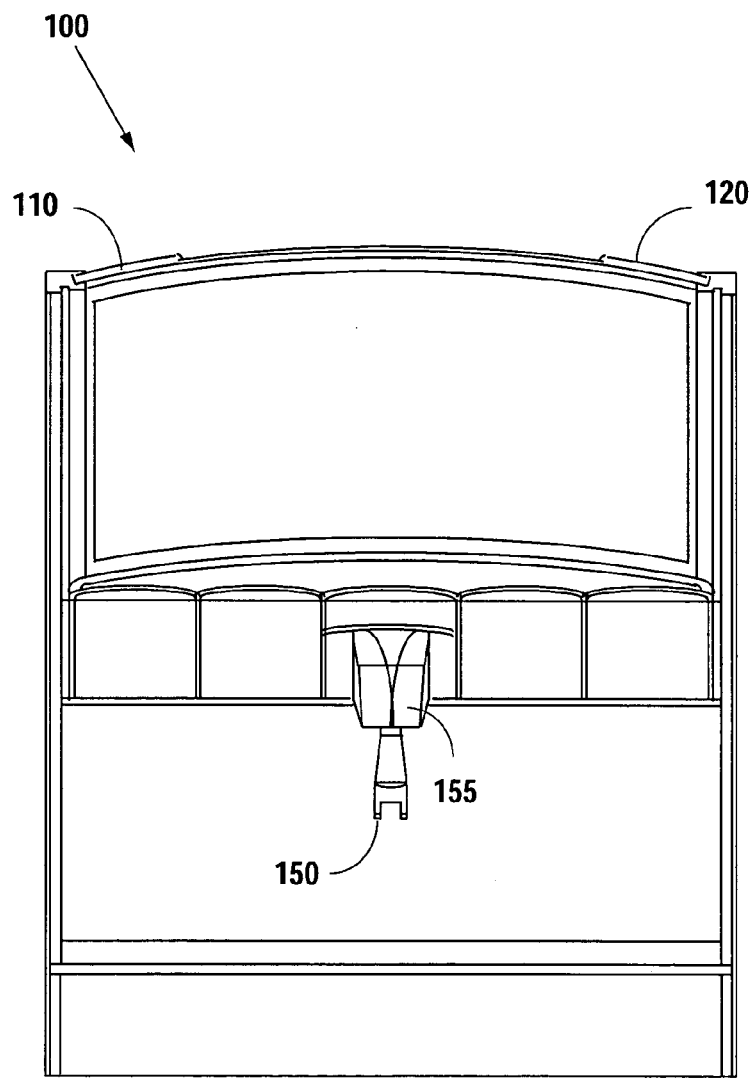
FIG. 1 provides a front view with a section view of a product dispenser according to the preferred embodiment.
Figure 1A:
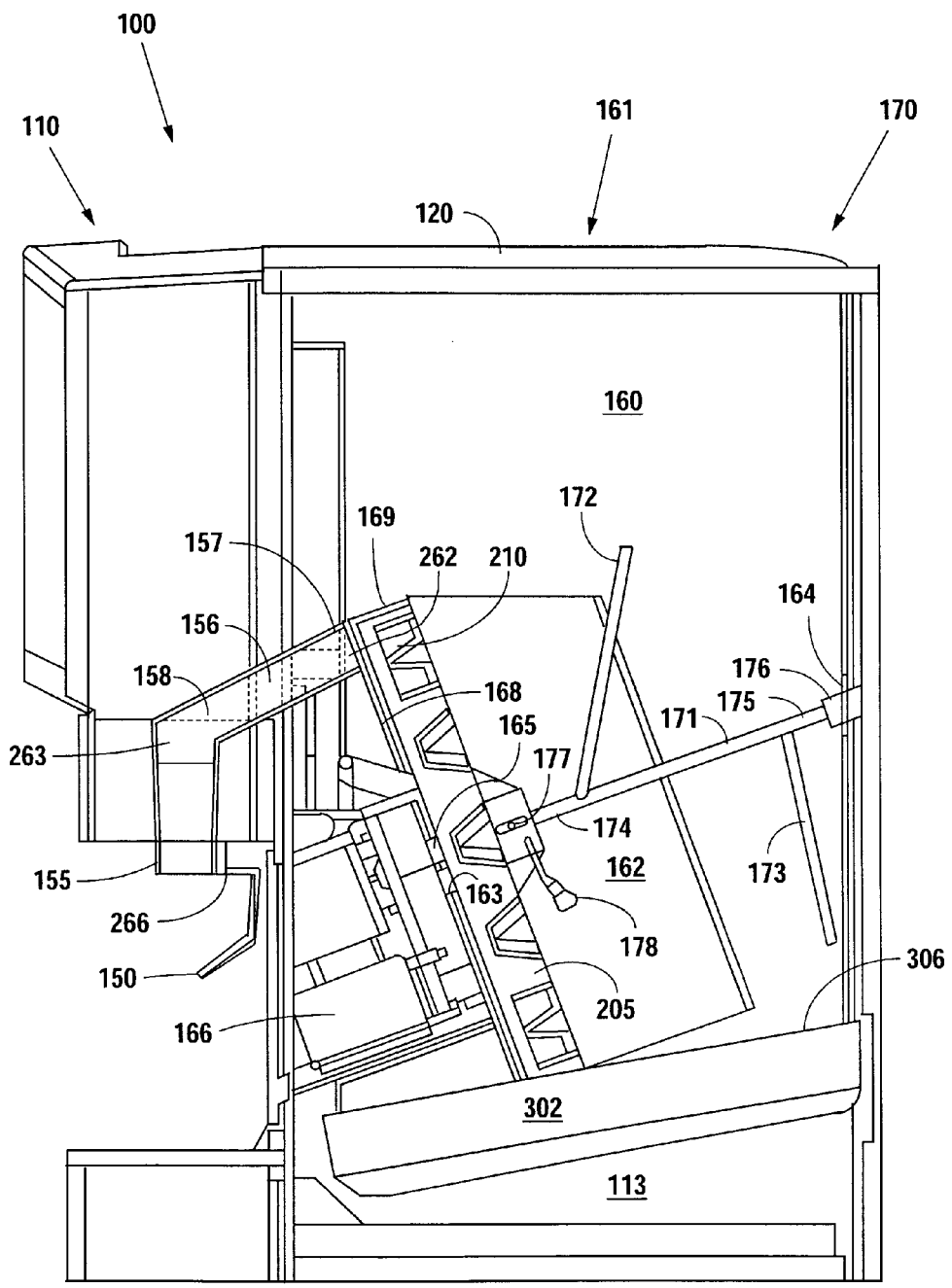
FIG. 1a provides a section view of the product dispenser according to the preferred embodiment.

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

A paddlewheel design in a dispensing system provides for the ability to move product in both rotation directions. The paddlewheel design includes symmetrical tangs that push ice. The symmetrical tangs allow the paddlewheel to rotate in either direction about an axis. The dual direction design further increases the inertial properties of tangs on the paddlewheel, thereby providing an increased strength. The dual direction paddlewheel also reduces inventory requirements and future tooling costs, as only one tool is now required.

As shown in FIGS. 1–4, a dispensing system 100 includes a housing 110, a bin liner 160, and an insulation 113. The housing 110 is any suitable structure that can be used to support and thermally isolate the product dispensing system 100. The bin liner 160 is a hollow shell that substantially conforms to the interior shape of the housing 110, thereby creating a storage bin 161. The bin liner 160 may rest on a top side 306 of a cold plate 302, thereby allowing the contents of the storage bin 161 and the coldplate 302 to thermally interact. The cold plate 302 is disposed within the housing 110 at an angle of substantially ten degrees, such that anything on a top face 306 of the cold plate 302 will move toward a front 101 of the beverage dispenser 100. The insulation 113 is located between the bin liner 160 and the housing 110, thereby keeping the storage bin 161 of the bin liner 160 insulated. A lid 120 may also be employed to close out the storage bin 161.

The bin liner 160 includes a cylindrical inset 162, the axis of which is substantially parallel to the angle of the cold plate 302. The cylindrical inset 162 includes an inner face 168, a cylindrical wall 169, and a lower shaft aperture 163 located on the axis of the cylindrical inset 162. The bin liner 160 further includes an upper shaft aperture 164. A shaft 165 of a drive mechanism 166 protrudes through the lower shaft aperture 163, thereby gaining access to an interior of the storage bin 161. The shaft 165 includes a pin aperture 167 for accepting a drive pin 178. In this preferred embodiment, the drive mechanism 166 is an electric motor with a gear reducer. The drive mechanism 166 is mounted on a front side 101 of the bin liner 160.

The dispensing system 100 further includes a paddlewheel 205 and an agitator bar 170. The paddlewheel 205 is an injection-molded component. The paddlewheel 205 includes a truncated conical body 204 having a front face 222, an outer periphery 206, and a protrusion 209 having a central aperture 207 and a pin aperture 221. The central aperture 207 passes through the paddlewheel 205 along the conical axis. The pin aperture 221 passes through the protrusion 209 and accepts the drive pin 178. A plurality of gussets 208 provides radial support for the protrusion 209. The paddlewheel 205 further includes tangs 210 that extend radially from the outer periphery 206.

The tangs 210 include a first angled leg 211, a second angled leg 212, and a crossbar 213, located between the angled legs 211 and 212. The first angled leg 211 includes a first end 214 and a second end 215. The second angled leg 212 includes a first end 218 and a second end 219, and the crossbar 213 includes a first end 216 and a second end 217. The first end 214 of the first angled leg 211 is located nearest the side of the protrusion 209. The second end 215 of the first angled leg 211 is joined to the first end 216 of the crossbar 213. The first end 218 of the second angled leg 212 is similarly located nearest the side with the protrusion 209. The second end 219 of the second angled leg 212 is joined to the second end 217 of the crossbar 213, such that the first and second angled legs 211 and 212 are symmetrical about a midpoint of the crossbar 213. The angle between the first angled leg 211 and the second angled leg 212 is substantially fifty degrees. The tangs 210 are arrayed around the axis of the truncated conical body 204. In this configuration, the tangs 210 include a primary face 223 and a secondary face 224. In this preferred embodiment, thirteen tangs 210 are evenly spaced along the outer periphery 206 of the paddlewheel 205.

The agitator bar 170 includes a shaft 171, a first arm 172, and a second arm 173. The shaft 171 and the arms are constructed from metallic bar, preferably stainless steel. The shaft 171 includes a pin aperture 177 at a first end 174 to accept the drive pin 178. The arms 172 and 173 are connected to the shaft 171 using any suitable means, for example welding. The first end 174 of the agitator bar 170 is connectable to the shaft 165 of the drive mechanism 166. A second end 175 of the shaft 171 is mountable to a bearing support 176 protruding through the upper shaft aperture 164. The bearing support 176 is suitably mounted to the housing 110 using snap features (not shown).

The dispensing system 100 further includes an ice delivery passage 156, an ice delivery chute 155 and an ice lever 150. The ice delivery passage 156 includes a first end 157 and a second end 158. The first end 157 of the ice delivery passage 156 is connected to an ice delivery port 262 located in the bin liner 160. The ice delivery port 262 is located within an uppermost portion of the inner face 168 of the cylindrical inset 162. The second end 158 of the ice delivery passage 156 is connected to an ice exit port 263 located near the center of the front 101 of the housing 110. A chute 155 is mounted to the ice exit port 263 such that exiting ice is deflected downward. The lever 150 is mounted behind the chute 155 such that an operator may activate the lever 150 while holding a cup underneath the chute 155.

On assembly, the central aperture 207 of the paddlewheel 205 is placed over the shaft 165 that protrudes through the lower shaft aperture 163 in the liner 160. A largest diameter of the paddlewheel 205 is smaller than the diameter of the cylindrical inset 162 of the liner 160, such that the paddlewheel 205 fits within cylindrical inset 162 and is free to rotate with the motor shaft 165 when placed on the shaft 165. Next, the first end 174 of the agitator bar 170 is placed over the shaft 165. The pin apertures 221 and 177 in the paddlewheel 205 and the agitator bar 170 must then be aligned with the pin aperture 167 in the shaft 165, thereby enabling the insertion of the drive pin 178. Once the drive pin 178 is inserted, the paddlewheel 205 and the agitator bar 170 must rotate with the shaft 165.

In this preferred embodiment the front face 222 of the paddlewheel 205 is at full engagement in the cylindrical inset 162 when the front face 222 of the paddlewheel 205 is approximately three tenths of an inch from the inner face 168 of the cylindrical inset 162. This close proximity prevents large product cubes from becoming lodged between the front face 222 of the paddlewheel 205 and the inner face 168 of the liner 160. A crest 225 of the tangs 210 is approximately one half of an inch from the front face 222 of the paddlewheel 205, thereby enabling the paddlewheel 205 to gather product cubes or groups of product cubes larger than that distance.

The product dispensing circuit 200 includes the storage bin 161, the agitator bar 170, the paddlewheel 205, a switch 266, the drive mechanism 166, a product delivery passage 156, and the product dispensing chute 155. Large quantities of product may be placed into the storage bin 161 by removing the lid 120 and dumping the product into the storage bin 161. The product may stay in the storage bin 161 for extended periods, thereby chilling the cold plate 302. The switch 266 is connected to the lever 150 such that when the lever 150 is depressed the switch 266 is closed and the drive mechanism 166 is powered. The shaft 165 commences to turn, thereby rotating the paddlewheel 205 and the agitator bar 170. As the paddlewheel 205 rotates, product is trapped in the areas between the tangs 210. The product moves along the inner face 168 and the cylindrical wall 169 of the cylindrical inset 162. As the drive mechanism 166 turns, product trapped by the paddlewheel 205 moves towards the product delivery passage 156. Once over the product delivery port 262, the product falls due to gravity into the product delivery passage 156. The product then moves down the product delivery chute 155 for dispensing.

Figure 3:
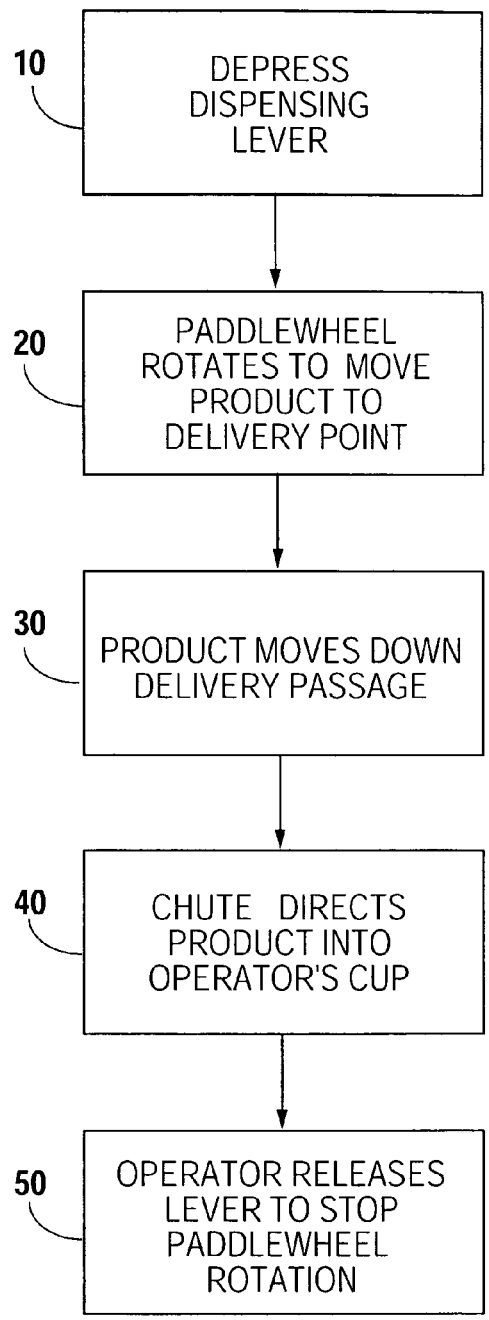
FIG. 3 provides a method for utilizing the ice dispensing system according to the preferred embodiment.

In operation, an operator positions a cup below the chute 155 and presses the lever 150 as shown in step 10 of the method flowchart of FIG. 3. The lever 150 may be depressed by the operator while holding the cup underneath the chute 155. Depressing the lever 150 closes the switch 266 to provide electrical power to the drive mechanism 166. Once the electrical power is received, the drive mechanism 166 commences to turn in the range of four to six revolutions per minute, and product located in the storage bin 161 is separated from the rest of the product by the tangs 210 of the paddlewheel 205 and pushed to the product delivery passage 156, step 20. Once the product is above the product delivery passage 156, the product falls away, continuing down the product delivery passage 156 as shown in step 30. Step 40 provides for directing the product downward with a chute to land in the operator's cup. Once the desired amount of product is obtained, the operator releases the lever 150 as shown in step 60.

It should be clear to one of ordinary skill in the art that the effective product contact surface is along the primary face 223 of the tangs 210. It should further be noted that the effective contact area of the tangs 210 in a first direction is identical to the effective contact area for the single rotation paddlewheel previously utilized. The effective contact area in a second direction is along a secondary face 224 also having the same effective contact area as the previous design. Accordingly, the paddlewheel 205 may be utilized in either the first rotation direction or the second rotation direction.

Figure 2:
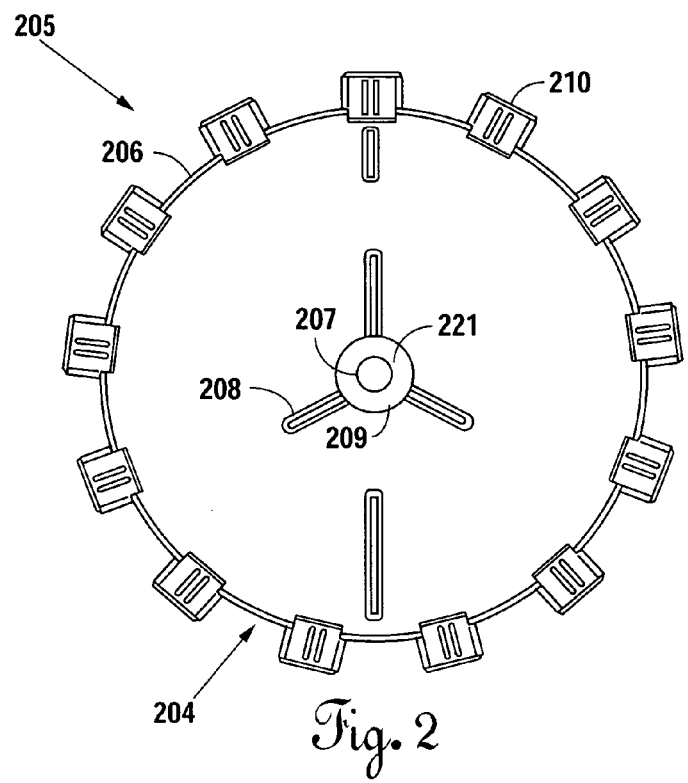
FIG. 2 illustrates a detail view of a paddlewheel according to the preferred embodiment.
Figure 2A:
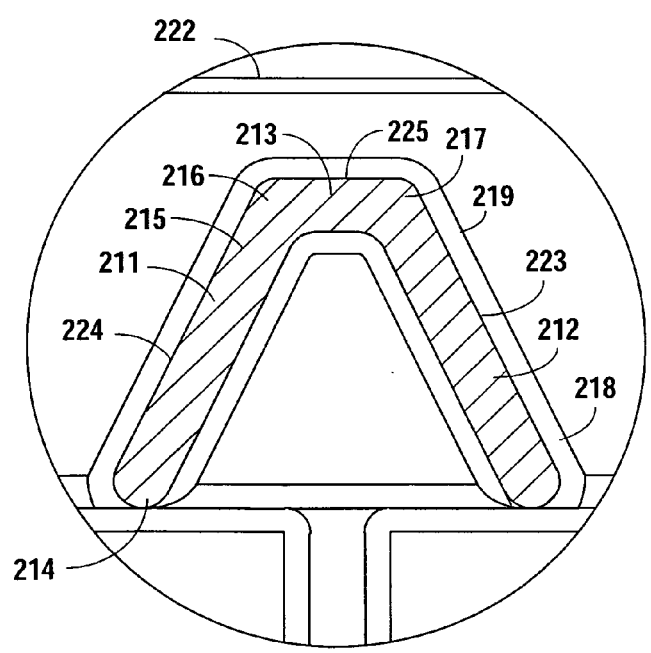
FIG. 2a provides an end view of a paddlewheel tang according to the preferred embodiment.
Figure 2B:
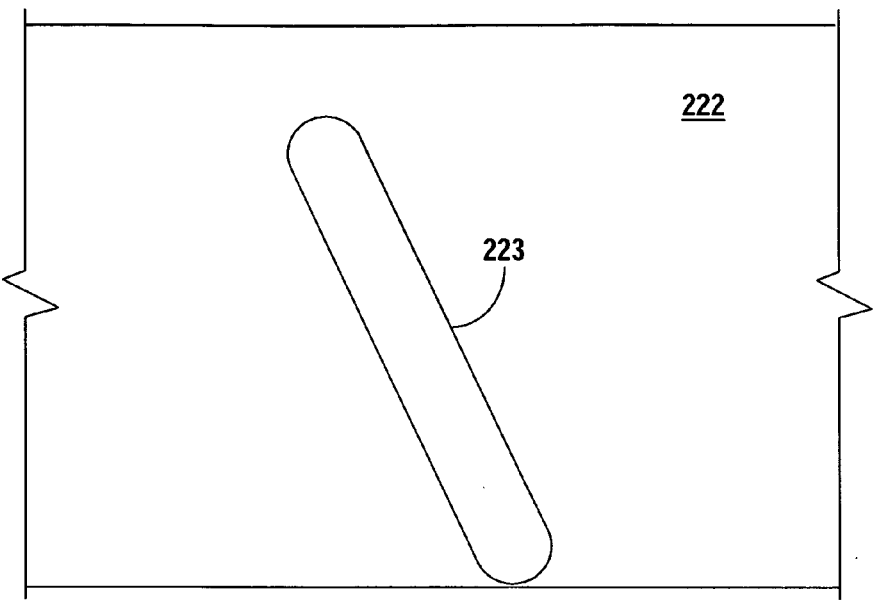
FIG. 2b illustrates the effective ice contact area of a current paddlewheel design.
Figure 2C:
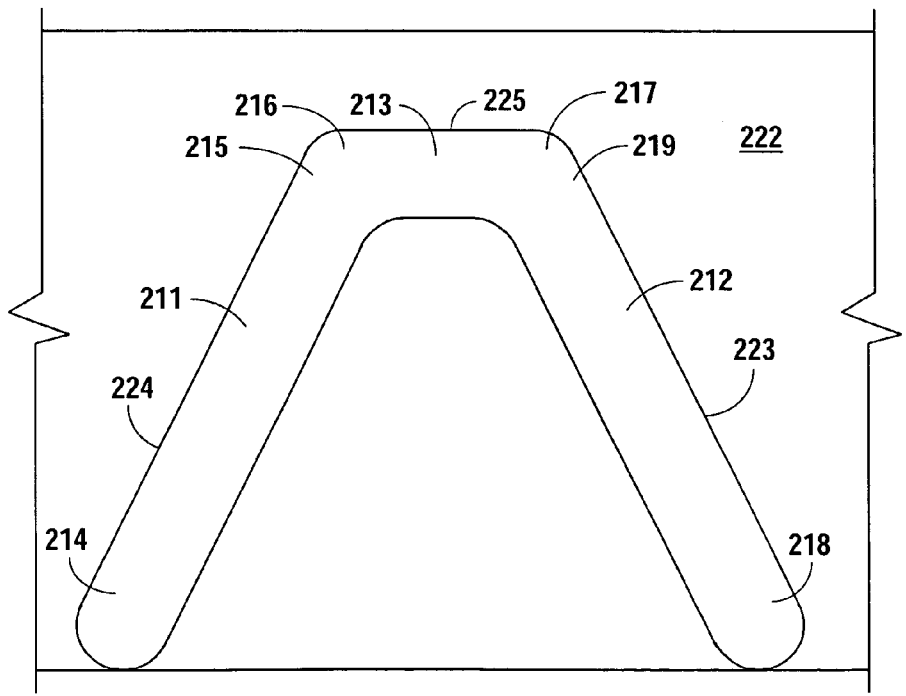
FIG. 2c illustrates the effective ice contact area according to the preferred embodiment.
Figure 2D:
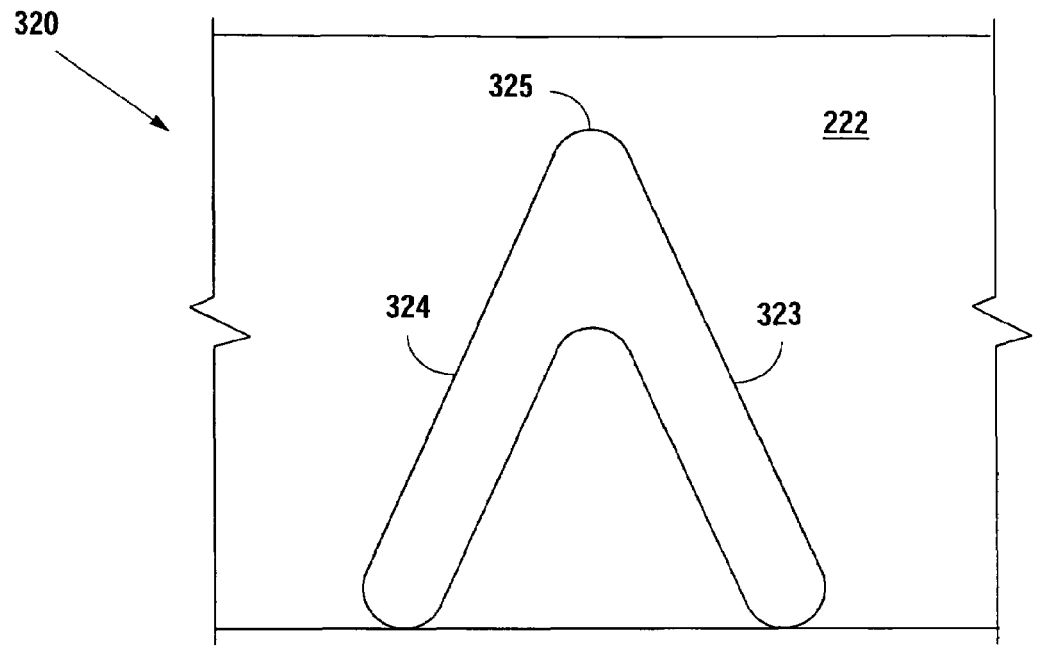
FIG. 2d illustrates the effective ice contact area of an embodiment not containing a crossbar.
Figure 2E:
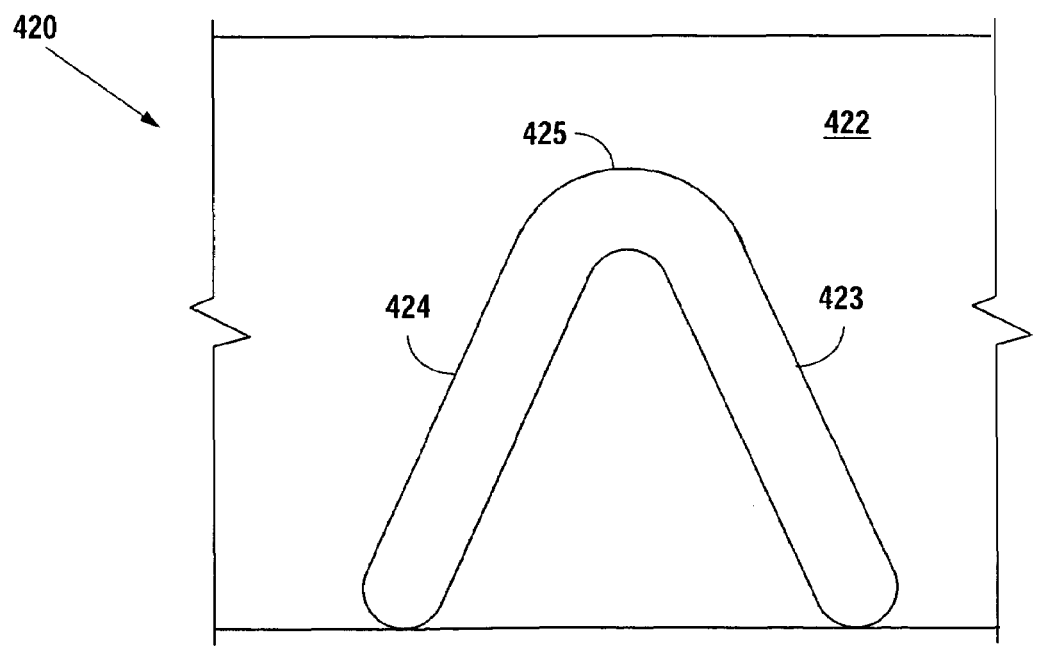
FIG. 2e illustrates the effective ice contact area of an embodiment not containing a cross-bar, but including a rounded crest.

A second embodiment of the paddlewheel includes a tang 320 without a crossbar as shown in FIG. 2d. The tang 320 includes a primary face 323 and a secondary face 324. A crest 325 is present in embodiments without a crossbar. The paddlewheel 305 is virtually identical to the paddlewheel 205 in use.

A third embodiment of the paddlewheel includes a tang 420 with a rounded crest 425. The tang 420 also includes a primary face 423 and a secondary face 424 while maintaining the same effective contact area as the previous embodiments. The paddlewheel 405 is virtually identical to the paddlewheel 205

The spacing between the tangs 210 may be adjusted to increase or decrease the number of tangs 210 on the outer periphery 206 of the paddlewheel 205 or the amount of product delivered to the product delivery passage 156. The tangs 210 may include a crossbar 213 for increased shear strength. The length of the crossbar 213 may also be adjusted to evenly arrange virtually any number of tangs 210 on the paddlewheel 205.

The dual direction paddlewheel 205 eliminates overhead costs associated with carrying a second paddlewheel variation. Tooling costs associated with a second single direction paddlewheel are also eliminated. An additional advantage includes increased shear strength. The increased shear strength of the tangs 210 reduces the occurrence of tang 210 breakage problems, thereby minimizing the possibility of tangs 210 being dispensed into an operator's cup.

This invention may be utilized with virtually any solid or semi-solid product, including ice and ice cubes. The spacing between the tangs 210 and the inner face 168, and the tangs 210 and the cylindrical wall 169 of the liner 160 may be adjusted to complement product having smaller or larger particulate sizes. It should further be noted that the dual rotation paddlewheel 205 may be effectively utilized in either the first or the second direction of rotation, or alternatively, both directions.

While this dispensing system 100 has been shown as a stand-alone unit, it should be clear to one of ordinary skill in the art that the dispensing system 100 may be utilized in conjunction with another device, for example a beverage dispenser. In this case, the product dispensing system 100 may be utilized to store a large quantity of ice and to dispense a small quantity of ice for chilling a beverage.

Figure 4:
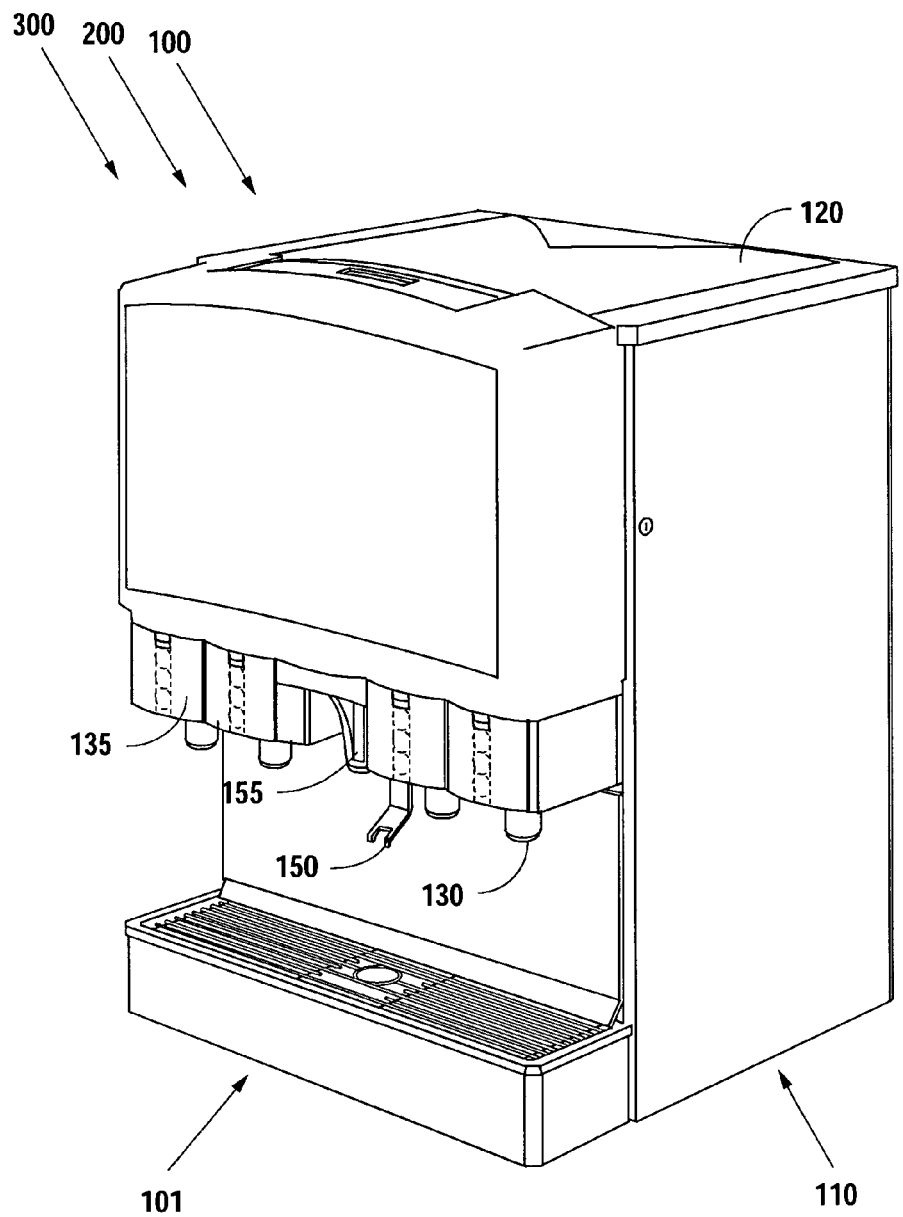
FIG. 4 includes a perspective view of the product dispensing system used in conjunction with a beverage dispenser.
Figure 4A:
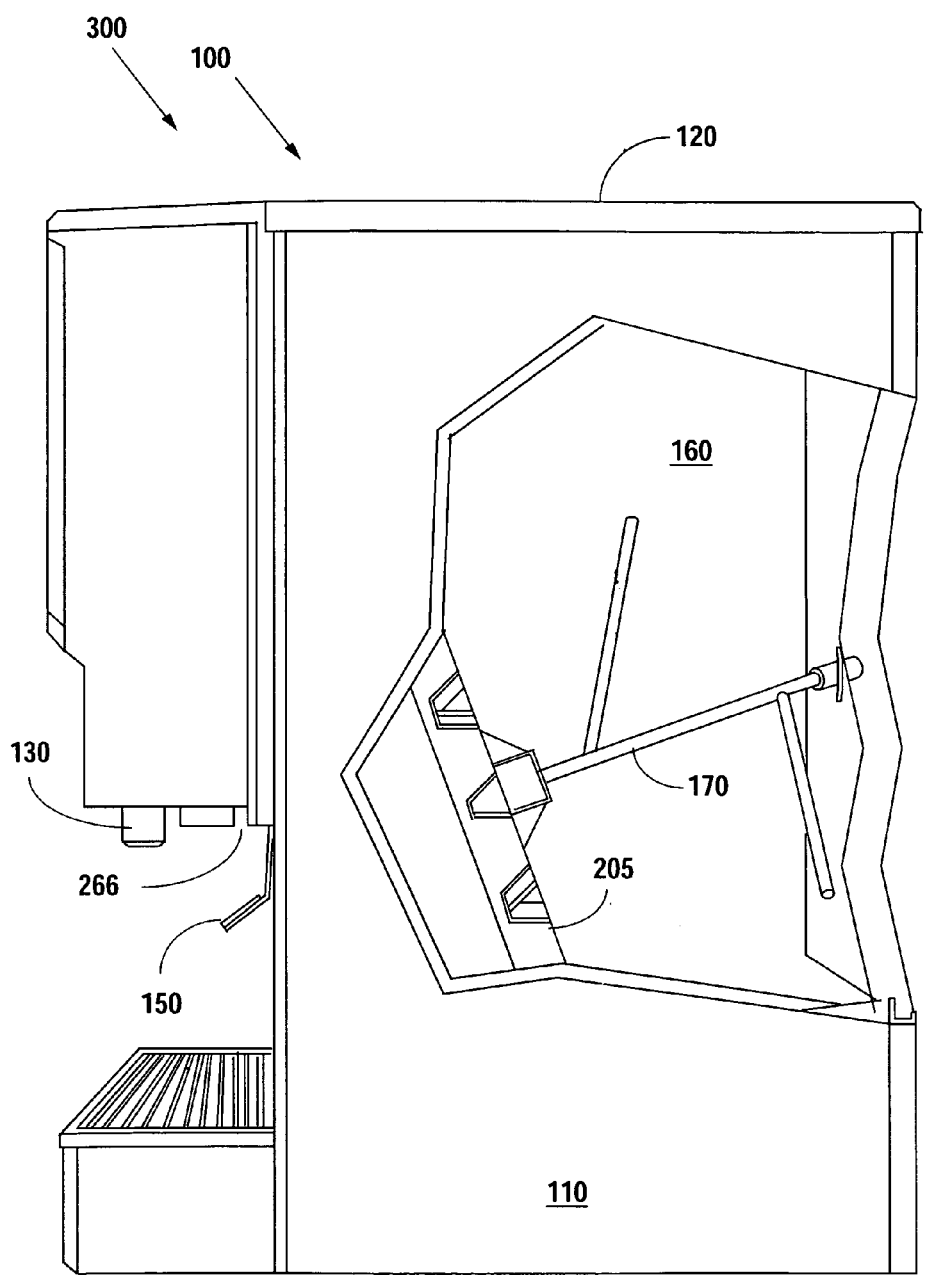
FIG. 4a provides a cutaway view of illustrating the product dispensing system.
Figure 4B:
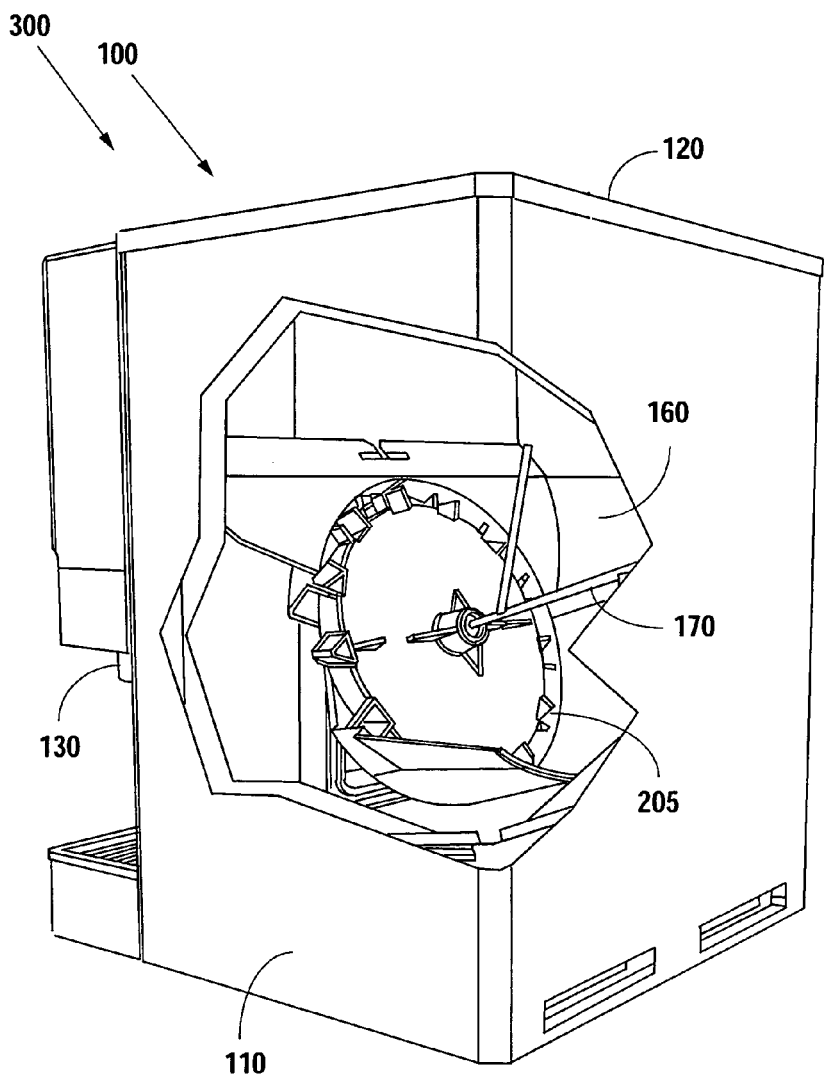
FIG. 4b provides a perspective view with a cutaway of the product dispensing system in combination with a beverage dispenser.
Figure 5:
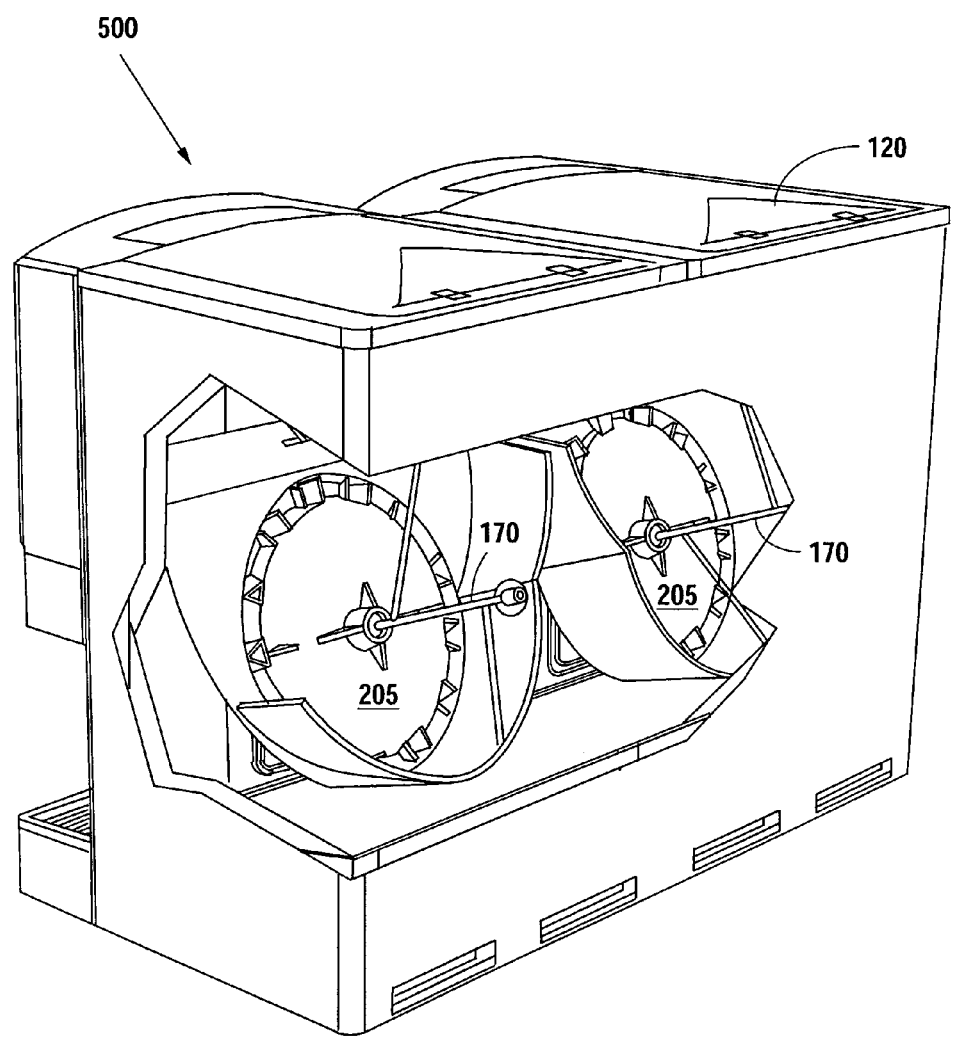
FIG. 5 provides a perspective view of a dual product dispensing system in use with a dual beverage dispenser application.

As shown in FIG. 4, an integrated dispenser 300 includes both components for the dispensing of beverages and the dispensing of product, for example ice, using the product dispenser 100. In this configuration, both the product and the beverages are available from the same side. Operators may dispense product, for example ice by depressing the lever 150, and then a beverage by selecting a flavor from an interface panel 135 and receiving the beverage through a nozzle 130. All other aspects of the product dispenser 100 are similar to those previously disclosed.

In a double-wide integrated dispenser application 500, opposite rotations of the paddlewheels 205 in the integrated dispensers are desirable, as the opposite rotations do not move all of the ice to one side of the integrated dispenser 500. The use of the dual rotation paddlewheel 205 is suitable for use in opposite rotation applications. Further, the paddlewheels 205 in opposite rotation applications are interchangeable.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

I claim:

1. Paddlewheel tangs, comprising:
   a primary face disposed on an outer periphery of a truncated conical body, wherein the truncated conical body rotates about an axis of the truncated conical body; and
   a secondary face disposed on the outer periphery of the truncated conical body substantially symmetrical to the primary face, wherein the primary face is adapted to move a product in a first rotation direction and the secondary face is adapted to move product in a second rotation direction.

2. The paddlewheel tangs according to claim 1, wherein the primary face and the secondary face are at an angle.

3. The paddlewheel tangs according to claim 1, wherein the tangs are symmetrical about a plane extending radially from the axis, and through a midpoint of the tangs.

4. The paddlewheel tangs according to claim 1, wherein the primary face and the secondary face have an equivalent effective contact area.

5. The paddlewheel tangs according to claim 1, wherein the substantially same amount of the product is delivered in either direction.

6. The paddlewheel tangs according to claim 1, wherein the product is ice.

7. The paddlewheel tangs according to claim 6, wherein the product is ice cubes.

8. The paddlewheel tangs according to claim 1, wherein a crest of the tangs is rounded.

9. A paddlewheel tang, comprising:
- a primary face extending outwardly from an outer periphery of a body, wherein the primary face moves a product in a first direction;
- a secondary face extending outwardly from the outer periphery of the body and disposed at an angle to the primary face, wherein the secondary face moves the product in a second direction; and
- a crossbar disposed between the primary face and the secondary face to increase the shear strength of the tang.

10. A paddlewheel, comprising:
- a truncated conical body having an outer periphery; and
- tangs disposed on the outer periphery of the truncated conical body, the tangs including a primary face coupled to a substantially symmetrical secondary face, wherein each face is equally adapted to move a product, and further wherein the truncated conical body may be rotated in either direction to move the product.

11. The paddlewheel according to claim 10, wherein the truncated cone rotates about the axis.

12. The paddlewheel according to claim 11, wherein the tangs are substantially symmetrical through a plane passing through the axis of the truncated cone and a midpoint of each tang.

13. The paddlewheel according to claim 12, wherein the primary face of a respective tang is substantially symmetrical to the secondary face of the respective tang through the plane passing through the axis of the truncated body and the midpoint of each tang.

14. The paddlewheel according to claim 10, wherein a crest of the tangs is rounded.

15. The paddlewheel according to claim 10, further comprising a central aperture disposed along an axis of the truncated conical body, wherein the paddlewheel rotates about the central aperture.

16. A paddlewheel, comprising:
- a truncated conical body having an outer periphery; and
- tangs disposed on the outer periphery of the truncated conical body, the tangs including a primary face coupled to a secondary face, wherein each face is equally adapted to move product, such that the truncated conical body may be rotated in either direction to move the product, and further wherein the tangs include a crossbar to increase the inertial properties of the tangs.

17. The paddlewheel according to claim 16, wherein the primary face is substantially symmetrical to the secondary face.

* * * * *